(12) United States Patent
Hamabe et al.

(10) Patent No.: US 7,912,474 B2
(45) Date of Patent: Mar. 22, 2011

(54) RADIO CHANNEL CONTROL METHOD IN A CELLULAR SYSTEM

(75) Inventors: Kojiro Hamabe, Tokyo (JP); Kenji Kawaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 832 days.

(21) Appl. No.: 11/099,524

(22) Filed: Apr. 6, 2005

(65) Prior Publication Data

US 2005/0233753 A1 Oct. 20, 2005

(30) Foreign Application Priority Data

Apr. 19, 2004 (JP) ................................ 2004-122732

(51) Int. Cl.
*H04W 72/00* (2009.01)
(52) U.S. Cl. ............... 455/452.2; 455/509; 455/436; 455/437; 455/438; 455/439; 455/440; 455/441; 455/442; 455/443; 455/444; 455/445; 455/446; 455/447; 455/448; 455/449; 455/450; 455/451; 455/452.1; 455/453; 455/464; 370/310; 370/331
(58) Field of Classification Search .......... 455/436–453, 455/464, 509; 370/310, 331
See application file for complete search history.

(56) References Cited

U.S. PATENT DOCUMENTS

| | | | | |
|---|---|---|---|---|
| 5,428,818 A | * | 6/1995 | Meidan et al. | 455/436 |
| 6,005,852 A | * | 12/1999 | Kokko et al. | 370/329 |
| 6,205,335 B1 | * | 3/2001 | Furusawa et al. | 455/436 |
| 6,266,531 B1 | * | 7/2001 | Zadeh et al. | 455/453 |
| 6,327,472 B1 | * | 12/2001 | Westroos et al. | 455/450 |
| 6,393,030 B1 | | 5/2002 | Kim et al. | |
| 6,519,461 B1 | * | 2/2003 | Andersson et al. | 455/453 |
| 6,567,420 B1 | * | 5/2003 | Tiedemann et al. | 370/468 |
| 6,594,241 B1 | * | 7/2003 | Malmlof | 370/329 |
| 6,760,303 B1 | * | 7/2004 | Brouwer | 370/229 |
| 6,788,943 B1 | * | 9/2004 | Hamalainen et al. | 455/450 |
| 2002/0160781 A1 | * | 10/2002 | Bark et al. | 455/450 |
| 2004/0125768 A1 | * | 7/2004 | Yoon et al. | 370/331 |
| 2004/0141479 A1 | | 7/2004 | Cha et al. | |

FOREIGN PATENT DOCUMENTS

| | | |
|---|---|---|
| GB | 2 353 188 | 2/2001 |
| GB | 2 357 221 | 6/2001 |
| JP | 6-507771 | 9/1994 |
| JP | 7-87569 | 3/1995 |
| JP | 11-018175 | 1/1999 |
| JP | 2002-503068 | 1/2002 |
| JP | 2002-217986 | 8/2002 |
| JP | 2003-209871 | 7/2003 |
| WO | WO-02/101956 | 12/2002 |

* cited by examiner

*Primary Examiner* — Patrick N Edouard
*Assistant Examiner* — Shantell Heiber
(74) *Attorney, Agent, or Firm* — Dickstein Shapiro LLP

(57) ABSTRACT

When a cell load becomes higher than a call setup threshold value for a first channel (CS channel), a second channel (PS channel) is changed into a channel having a low transmission rate. Consequently, the cell load is reduced and no cell loss occurs in the first channel. Therefore, the call loss rate of a first communication service is lowered. Simultaneously, a handover threshold value is higher than the call setup threshold value for the first channel so that a failure rate of handover is lowered.

7 Claims, 5 Drawing Sheets

RADIO CHANNEL CONTROL METHOD IN A CELLULAR SYSTEM

This application claims priority to prior Japanese patent application JP 2004-122732, the disclosure of which is incorporated herein by reference.

BACKGROUND OF THE INVENTION

This invention relates to a radio channel control method in a cellular system for providing a plurality of kinds of communication services, such as a telephone service and an Internet connection service.

In recent years, a cellular system provides a data communication service such as an Internet connection service in addition to a communication service such as a telephone service and a TV telephone service. In telephone communication as speech communication, information is generally transferred by circuit switching (CS). In data communication, information is generally transferred by packet switching (PS). In the following description, a call in the speech communication and a call in the data communication will be referred to as a CS call and a PS call, respectively.

In the cellular system of the type, it is desired to minimize call loss of CS calls and to accommodate as large traffic of PS calls as possible. In either of the CS call and the PS call, it is desired that a failure rate of handover is smaller than that of call connection. This is because, in case of the CS calls a failure in handover results in interruption of telephone conversation so that a user can not accomplish an object of communication. In case of the PS call, a failure in handover results in interruption of transmission of data and often requires re-transmission of the data. This means that a resource used in first data transmission is useless. Further, it is desired to maintain a communication quality of a channel currently used.

In order to satisfy the above-mentioned demands, a typical cellular system adopts a control method as shown in FIG. 1. Specifically, a load of each cell is calculated and compared with a predetermined call setup threshold value. If the load exceeds the call setup threshold value, no channel is assigned. If the load is smaller than the call setup threshold value, a channel is assigned. Herein, a PS call setup threshold value is lower than a CS call setup threshold value. If the load is greater than the PS call setup threshold value, a new channel is not assigned to PS calls so as to reserve resources for accommodating CS calls. Thus, a call loss rate of the CS calls is reduced. Further, it is assumed that a mobile station moves from a cell where a call is originated and a channel is first assigned to the call to another cell as a destination cell and that the call is handed over. In this event, a new channel is assigned if a load of the destination cell is lower than a handover threshold value. The handover threshold value is selected to be higher than both of the CS call and the PS call setup threshold values so that the probability of failure in handover is reduced.

However, upon carrying out handover of the CS call or the PS call, a channel may be assigned when the load of the cell is higher than the CS call setup threshold value. Thus, the load of the cell exceeds the CS call setup threshold value at a high probability. This results in an increase in call loss rate of CS calls.

In recent years, in realtime speech communication also, information may sometimes be transferred by packet switching. In case where the CS call and the PS call are replaced by a call in a realtime communication service of a conversational or a streaming traffic class and a call in a non-realtime communication service of an interactive or a background traffic class, respectively, there is a similar drawback to that described above. Further, in case where the CS call and the PS call are replaced by a call in a high-priority communication service and a call in a low-priority communication service, respectively, there is a quite similar drawback.

Japanese Unexamined Patent Application Publication (JP-A) No. 2002-217986 (Patent Document 1) discloses a method of changing circuit switching and packet switching. Specifically, when a new call is originated, the call is at first assigned with a packet-switched communication channel. If a communication time of the call using the packet-switched communication channel exceeds a predetermined time or if the frequency of occurrence of packet collision in the call exceeds a predetermined value, the packet-switched communication channel assigned to the call is changed to a circuit-switched communication channel.

Japanese Unexamined Patent Application Publication (JP-A) No. H11-18175 (Patent Document 2) discloses a communication method in which a communication rate is automatically controlled. Specifically, in case where data transmission is cyclically carried out between a master station and a plurality of slave stations according to a CDT (Cyclic Digital Telemeter) system, the master station measures a processing load and a communication rate of each channel is changed depending upon the processing load.

Japanese Unexamined Patent Application Publication (JP-A) No. 2002-503068 (Patent Document 3) discloses that a channel rate assigned to a call connection request is determined by an occupied cell capacity.

SUMMARY OF THE INVENTION

It is an object of this invention to enable accommodation of as large traffic as possible of a call (PS call) in a packet-switched communication service and to suppress a call loss rate of a call (CS call) in a circuit-switched communication service and a failure rate of handover of the CS call or the PS call.

It is another object of this invention to enable accommodation of as large traffic as possible of a non-realtime communication service or a low-priority communication service and to suppress a call loss rate in a realtime communication service or a high-priority communication service and a failure rate of handover.

According to this invention, a radio channel control method in a cellular system is as follows:

(1) A radio channel control method for use in a cellular system, in which a base station provides a plurality of mobile stations present in a first cell covered by the base station with a first communication service by the use of a first channel and with a second communication service by the use of a second channel, a base station controller connected to the base station carrying out steps of calculating, as a load of the first cell, a load corresponding to channels currently used in the first cell, allowing assignment of the first channel if the load is not higher than a first channel threshold value, allowing assignment of the second channel if the load is not higher than a second channel threshold value, and allowing a mobile station present in a second cell adjacent to the first cell and using one of the first and the second channels to use the one of the first and the second channels also in the first cell if the load is not higher than a handover threshold value, wherein:

the method includes the step of changing the second channel to a channel having a transmission rate lower than that of the second channel if at least one mobile station uses the second channel in the first cell and if the load of the first cell exceeds the first channel threshold value.

(2) The radio channel control method for use in a cellular system according to (1), wherein the handover threshold value is higher than the first channel threshold value.

(3) The radio channel control method for use in a cellular system according to (1), wherein a channel having a high transmission rate is assigned to a mobile station using a channel having a low transmission rate if the load of the first cell is lower than the second channel threshold value or lower than another threshold value lower than the second channel threshold value.

(4) The radio channel control method for use in a cellular system according to (1), wherein a common channel adapted to perform data transmission to the mobile stations is included as the channel having a low transmission rate.

(5) The radio channel control method for use in a cellular system according to (1), wherein the first communication service is a circuit-switched communication service and the second communication service is a packet-switched communication service.

(6) The radio channel control method for use in a cellular system according to (1), wherein the first communication service is a realtime communication service of a conversational or a streaming traffic class and the second communication service is a non-realtime communication service of an interactive or a background traffic class.

(7) The radio channel control method in a cellular system according to (1), wherein the first communication service is a high-priority communication service and the second communication service is a low-priority communication service.

None of the above-referred Patent Documents 1-3 disclose "the step of changing the second channel to a channel having a transmission rate lower than that of the second channel if at least one mobile station uses the second channel in the first cell and if the load of the first cell exceeds the first channel threshold value" in the above-mentioned (1).

This invention has an effect of enabling accommodation of as large traffic as possible of a call (PS call) in a packet-switched communication service and of suppressing a call loss rate of a call (CS call) in a circuit-switched communication service and a failure rate of handover of the CS call or the PS call.

This invention has another effect of enabling accommodation of as large traffic as possible of a non-realtime communication service or a low-priority communication service and of suppressing a call loss rate in a realtime communication service or a high-priority communication service and a failure rate of handover.

DESCRIPTION OF THE PREFERRED EMBODIMENT

Figure 1:
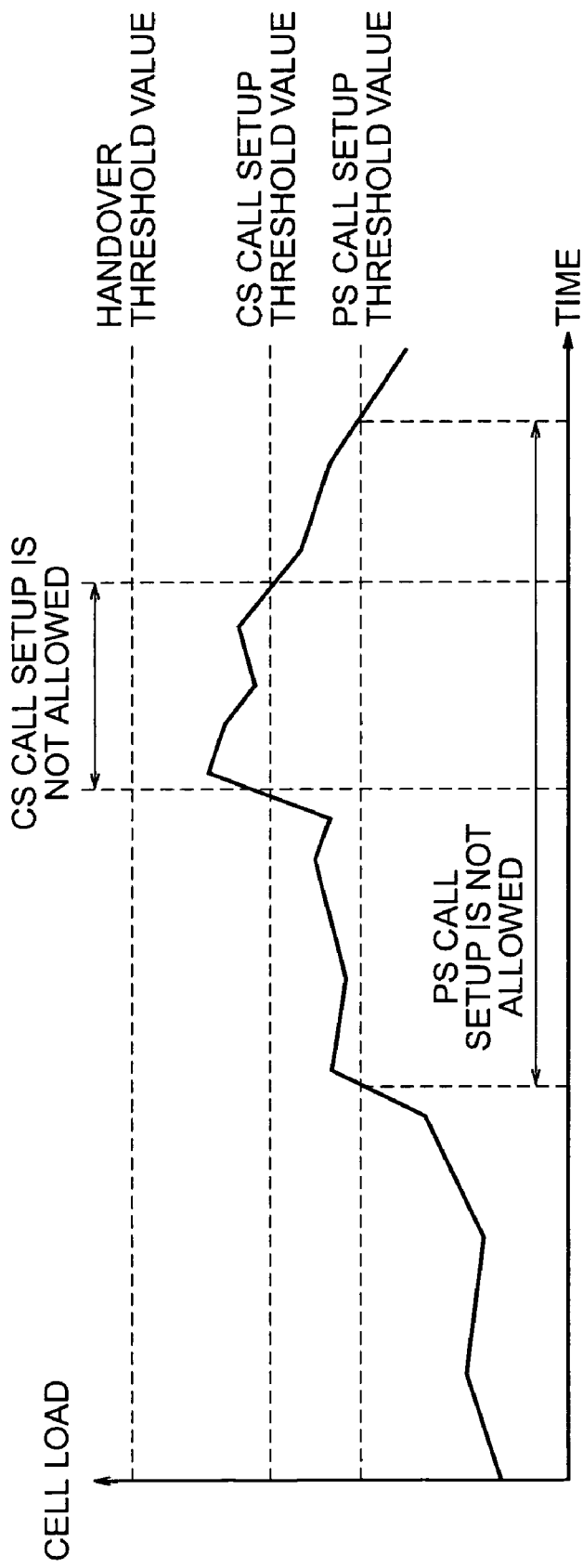
FIG. 1 is a view for describing cell load conditions in which call setup and handover are allowed.

Now, description will be made of preferred embodiments of this invention with reference to the drawing.

As will hereinafter be described in detail, in this invention, when a load of a first cell exceeds a call setup threshold value for a first channel, a second channel is changed to another channel having a low transmission rate (or changed to a common channel). Therefore, the load of the first cell is lowered and no call loss occurs in the first channel. Therefore, the call loss rate of the first communication service is lowered. Simultaneously, since a handover threshold value is higher than the call setup threshold value for the first channel, the failure rate of handover is lowered.

If the load of the first cell is higher than the call setup threshold value for the first channel and if the second channel is not changed to another channel having a low transmission rate, it is necessary to set a low value as a call setup threshold value for the second channel in order to suppress the call loss rate of the first channel. However, in this invention, even if the call setup threshold value for the second channel is relatively high, the call loss rate of the first communication service can be suppressed. Simultaneously, by setting a relatively high value as the call setup threshold value for the second channel, a traffic accommodation ability of the second communication service can be increased.

Figure 2:
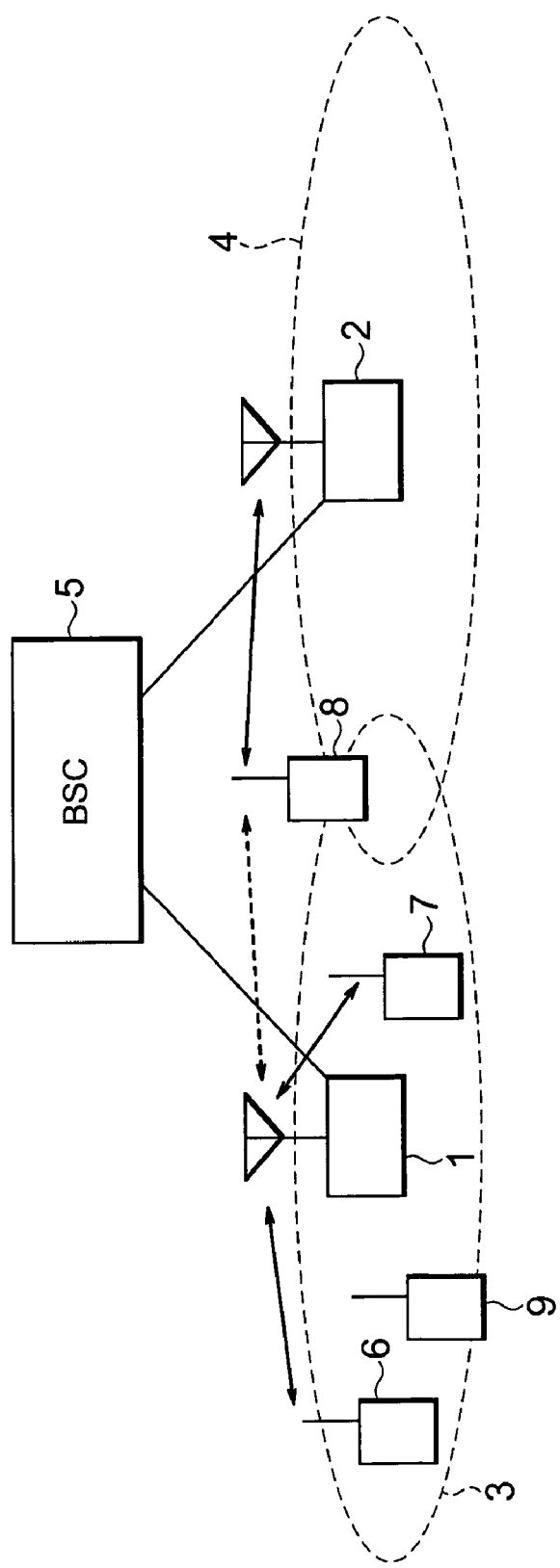
FIG. 2 is a view showing a cellular system to which this invention is applicable.

Referring to FIG. 2, a cellular system to which this invention is applicable includes first and second base stations 1 and 2, first and second cells 3 and 4 covered by the first and the second base stations 1 and 2, respectively, a base station controller (BSC) 5 connected to the first and the second base stations 1 and 2, and a plurality of mobile stations 6, 7, 8, and 9. Although not shown in the figure, the cellular system further includes a number of base stations and a number of mobile stations in addition to the above-mentioned components. The cellular system adopts a CDMA (Code Division Multiple Access) system as a radio access system.

In a first embodiment of this invention, the cellular system provides a speech communication service as a first communication service and a data communication service as a second communication service.

In speech communication, information is transferred by circuit switching (CS). In data communication, information is transferred by packet switching (PS). Accordingly, a call in the speech communication will be referred to as a CS call while a call in the data communication will be referred to as a PS call.

The base station controller 5 establishes a speech channel and a data channel between the base station and the mobile station if the speech communication service is provided and if the data communication service is provided, respectively. Each of the speech channel and the data channel has an uplink and a downlink. For the speech channel, the uplink and the downlink has a same transmission rate. On the other hand, for the data channel, the uplink has a predetermined transmission rate (for example, 64 kbps) while the downlink includes channels having a plurality of transmission rates (for example, 256 kbps and 64 kbps).

Thus, it is assumed in the cellular system that the speech channel uses the same transmission rate in the uplink and in the downlink and that the uplink data channel has a low transmission rate alone. Then, an uplink load is always smaller than a downlink load. Therefore, CS call setup, PS call setup, execution of handover, and change in transmission rate of the data channel are determined depending upon the downlink load alone.

For each of the first and the second cells, the base station controller calculates the downlink load L every time when a channel is established or released. Specifically, the downlink load L is calculated by multiplying the transmission rate and desired Eb/No for each channel to obtain a product and summing the products for all channels according to the following equation:

$$L = \sum_{i=1}^{N} \{R(i) \cdot E(i)\}$$

Herein, R(i) represents the transmission rate of an i-th channel, E(i), the desired Eb/No (energy per bit/noise spectral density), N, the number of channels established in each cell.

The base station controller holds a CS call setup threshold value, a PS call setup threshold value, and a handover threshold value which are determined so that the handover threshold value is highest and the PS call setup threshold value is lowest. The handover threshold value is determined so that, when the load of the cell is equal to the handover threshold value, a downlink base station transmission power does not exceed an upper limit. For example, the handover threshold value is determined so that the downlink base station transmission power is equal to 90% as the upper limit when the load of the cell is equal to the handover threshold value. The CS call setup threshold value is determined to be equal to 80% of the handover threshold value. The PS call setup threshold value is determined to be equal to 60% of the handover threshold value.

Figure 3:
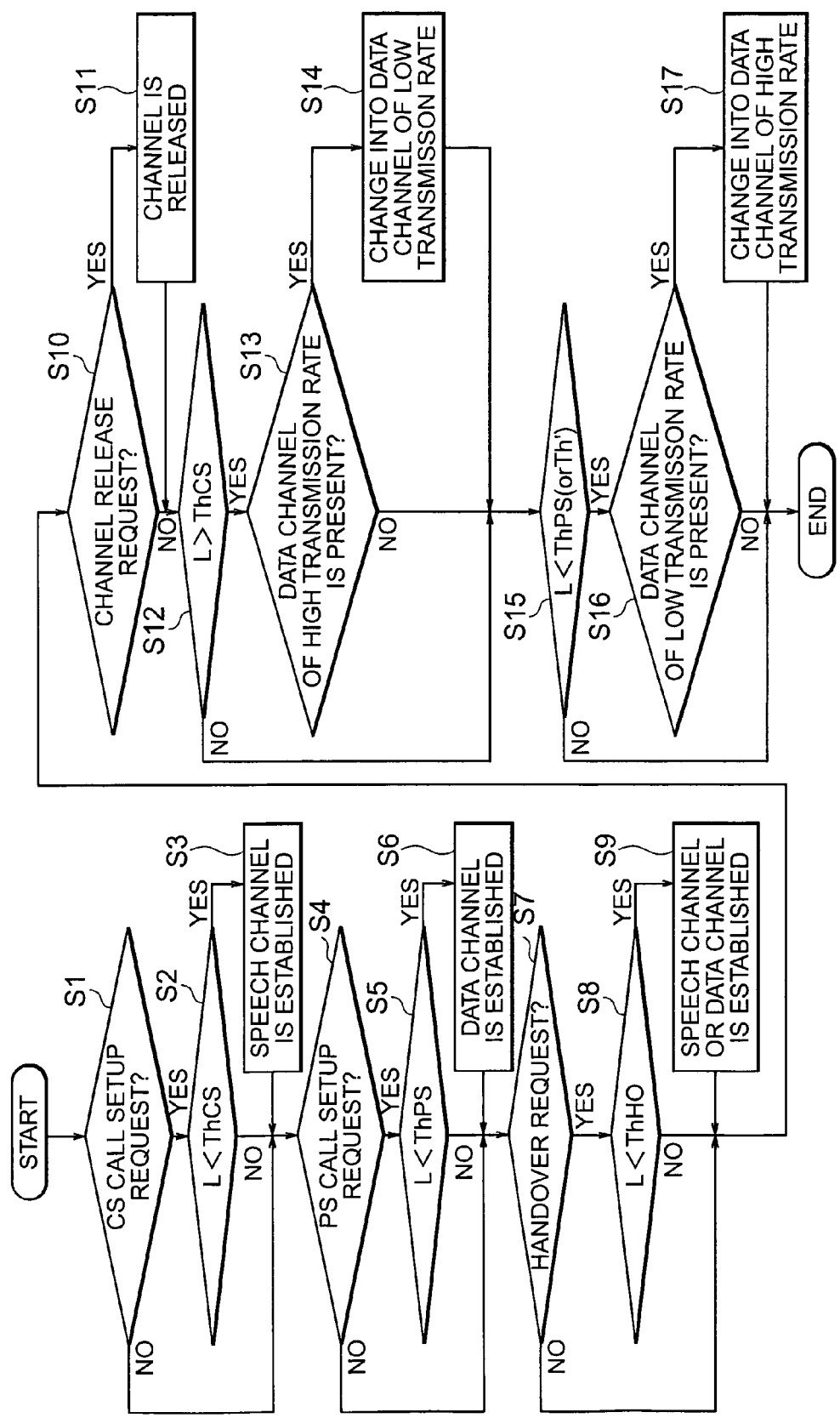
FIG. 3 is a flow chart of radio channel control by a base station controller according to a first embodiment of this invention.

Referring to FIG. 3, description will be made of radio channel control at the base station controller. The radio channel control includes CS call setup, PS call setup, handover, and change in transmission rate of the data channel with respect to the first cell 3.

When a speech channel setup request is produced, the base station controller establishes a speech channel if the load (L) of the first cell 3 is lower than the CS call setup threshold value (ThCS) (steps S1 to S3).

When a data channel setup request is produced, the base station controller establishes a data channel having a high transmission rate if the load (L) of the first cell 3 is lower than the PS call setup threshold value (ThPS) (steps S4 to S6).

When a handover request for speech channel or data channel setup is produced, a requested channel is established if the load (L) of the first cell 3 is lower than the handover threshold value (ThHO) (steps S7 to S9). At this time, the requested channel is of the type (speech channel or data channel) same as that of a prior channel established prior to the handover. In case of the data channel, the requested channel has the same transmission rate as the prior channel.

When speech communication or data communication is finished and a channel release request is produced, the channel is released (steps S10 and S11).

The load (L) of the first cell 3 is compared with the CS call setup threshold value (ThCS) and, if the load of the cell is higher than the CS call setup threshold value and if data channels having a high transmission rate are present, one of the data channels having a higher transmission rate is selected and changed into a data channel of a low transmission rate (steps S12 to S14).

If a plurality of the data channels having a high transmission rate are present, one of the channels which is shortest in elapsed time from call setup is selected. The load (L) of the first cell 3 is compared with the PS call setup threshold value (ThPS) and, if the load of the cell is lower than the PS call setup threshold value and if data channels having a low transmission rate are present, one of the data channels having a low transmission rate is selected and changed into a data channel having a high transmission rate (steps S15 to S17).

If a plurality of the data channels having a low transmission rate are present, one of the data channels which is longest in elapsed time from call setup is selected.

In the steps S15 to S17, the load (L) of the first cell 3 may be compared with another threshold value (Th') lower than the PS call setup threshold value (ThPS). If the load of the cell is lower than the above-mentioned another threshold value and if data channels having a low transmission rate are present, one of the data channels having a low transmission rate is selected and changed into a data channel having a high transmission rate.

Figure 4:
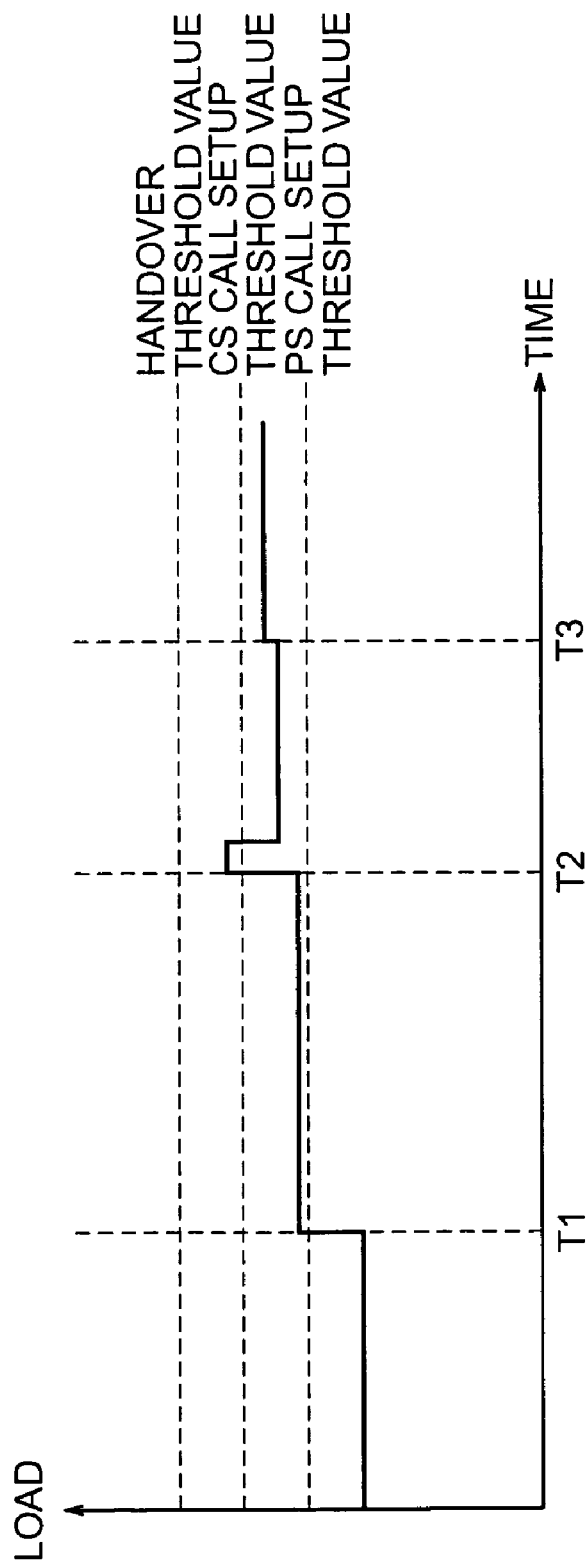
FIG. 4 is a view for describing a radio channel control operation of the base station controller according to the first embodiment.

FIG. 4 shows the change in load of the first cell 3 as an example of operation of the radio channel control including CS call setup, PS call setup, handover, and change in transmission rate of the data channel.

Referring to FIG. 4, the mobile station 6 present in the cell 3 establishes a speech channel with the base station 1 prior to a time instant T1 and is currently involved in communication.

At the time instant T1, the mobile station 7 present in the cell 3 establishes a data channel having a high transmission rate with the base station 1 and starts communication.

The mobile station 8 present in the second cell 4 establishes a data channel having a high transmission rate with the base station 2 prior to a time instant T2 and is currently involved in communication.

At the time instant T2, a difference in reception signal level between the base stations 1 and 2 is smaller than a predetermined value and the base station 1 is given a handover request. At this time, since the load is smaller than the handover threshold value, a data channel same as that of the base station 1 is established.

At the time instant T2, the data channel with the mobile station 8 is established. Then, the load of the cell 3 exceeds the CS call setup threshold value. Therefore, the data channel of the mobile station 8 is changed into a data channel having a low transmission rate. As a consequence, the load of the cell 3 is reduced and becomes smaller than the CS call setup threshold value. At a time instant T3, the mobile station 9 requests setup of a new speech channel. Since the load is smaller than the CS call setup threshold value, the speech channel is established and communication is started.

Next, a second embodiment of this invention will be described.

The second embodiment is similar to the first embodiment except that, in addition to the data channel having a plurality of transmission rates and similar to that in the first embodiment, a common channel adapted to perform data transmission to a plurality of mobile stations is present as a downlink data channel and that the operation of the base station controller is different as follows.

Figure 5:
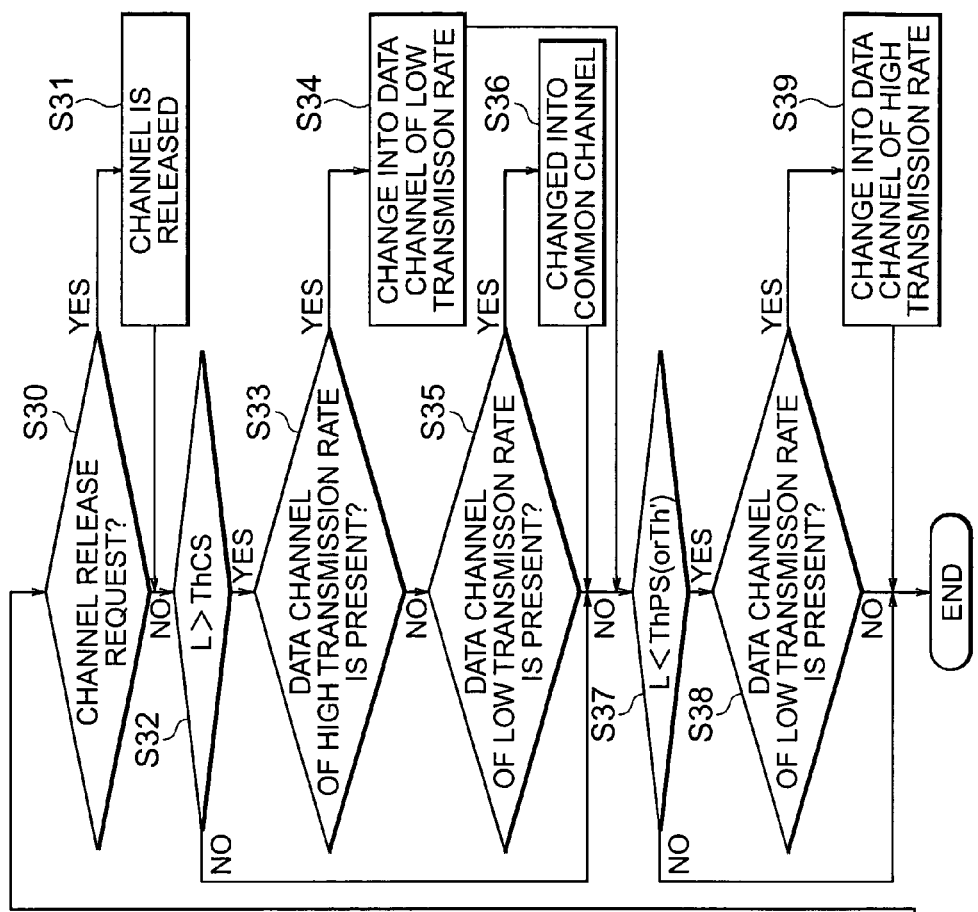
FIG. 5 is a flow chart of radio channel control by a base station controller according to a second embodiment of this invention.
Figure 5:
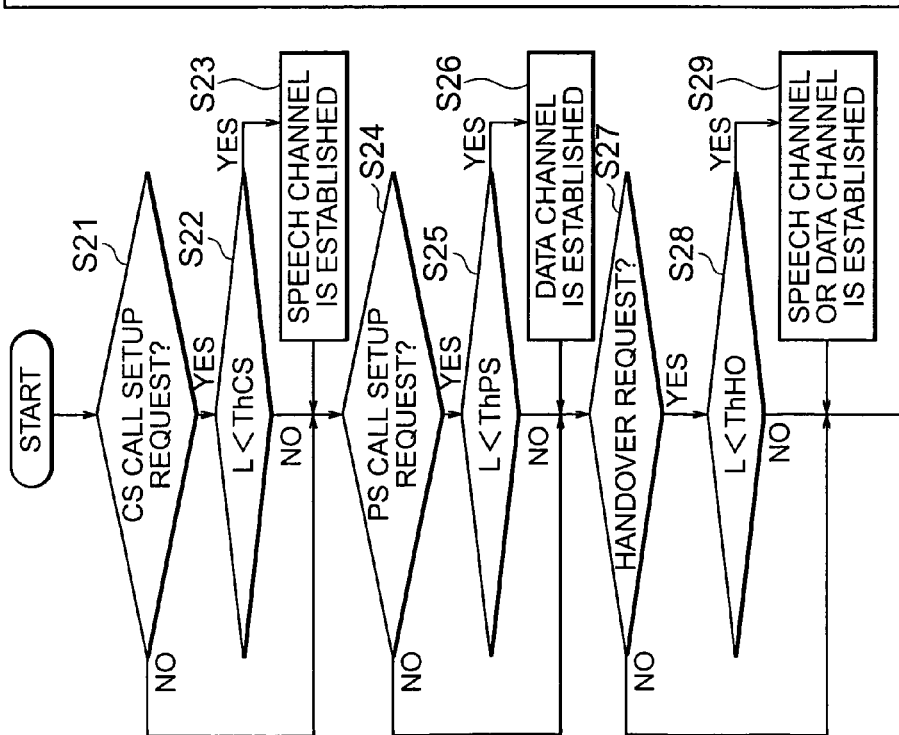

FIG. 5 shows a flow chart of radio channel control at the base station controller, including CS call setup, PS call setup, handover, and change in transmission rate of the data channel with respect to the first cell 3.

Referring to FIG. 5, steps S21 to S31 at the base station controller are similar to the steps S1 to S11 in the first embodiment. If the load (L) of the first cell 3 exceeds the CS call setup threshold value (ThCS) and if a data channel having a high transmission rate is present, the data channel is changed into a data channel having a low transmission rate. If the load (L) of the first cell 3 exceeds the CS call setup threshold value (ThCS) and if a data channel having a high transmission rate is not present, a data channel having a low transmission rate, if it is present, is changed into a common channel (steps S32 to S36). Steps S37 to S39 at the base station controller are similar to the steps S15 to S17 in the first embodiment.

Next, a third embodiment of this invention will be described. In the third embodiment, the cellular system provides a realtime communication service of a conversational or a streaming traffic class as a first communication service and a non-realtime communication service of an interactive or a background traffic class. Except the above, the third embodiment is similar to the first embodiment. By replacing the CS call and the PS call in the first embodiment by a call in the realtime communication service of the conversational or the streaming traffic class and a call in the non-realtime communication service of the interactive or the background traffic class, respectively, the third embodiment is similarly implemented.

Next, a fourth embodiment of this invention will be described. In the fourth embodiment, a high-priority data communication service is provided as the first communication service. A low-priority data communication service is provided as the second communication service. Except the above, the fourth embodiment is similar to the first embodiment. By replacing the CS call and the PS call in the first embodiment by a call in the high-priority data communication service and a call in the low-priority data communication service, respectively, the fourth embodiment is similarly implemented.

In the first embodiment, when the load of the cell exceeds the CS call setup threshold value, a data channel having a high transmission rate is changed into a data channel having a low transmission rate. Consequently, the load of the cell becomes lower than the CS call setup threshold value. This brings about an increase in probability that the CS call setup is allowed and a decrease in call loss rate of the CS call.

In the second embodiment, even if the data channel of a high transmission rate is not present, the data channel having a low transmission rate, if it is present, is released and the common channel is used. This brings about an increase in probability that the load of the cell is reduced and a further decrease in call loss rate of the CS call.

In the third embodiment, the call loss rate for the call in the realtime communication service is reduced in the manner similar to the first embodiment.

In the fourth embodiment, the call loss rate for the call in the high-priority communication service is reduced in the manner similar to the first embodiment.

While the present invention has thus far been described in connection with preferred embodiments thereof, it will readily be possible for those skilled in the art to put this invention into practice in various other manners.

What is claimed is:

1. A radio channel control method for use in a cellular system, in which a base station provides a plurality of mobile stations present in a first cell covered by said base station with a first communication service by the use of a first channel and with a second communication service by the use of a second channel, a base station controller connected to said base station carrying out steps of
calculating, as a load of said first cell, a load corresponding to channels currently used in said first cell,
allowing assignment of said first channel if said load is not higher than a first channel threshold value for said first channel,
allowing assignment of said second channel if said load is not higher than a second channel threshold value for said second channel, and
allowing a mobile station present in a second cell adjacent to said first cell and using one of said first and said second channels to use said one of the first and the second channels also in said first cell if said load is not higher than a handover threshold value,
wherein: said method includes the step of changing said second channel to a channel having a transmission rate lower than that of said second channel if at least one mobile station uses said second channel in said first cell and if said load of the first cell exceeds said first channel threshold value for said first channel.

2. The radio channel control method for use in a cellular system according to claim 1, wherein said handover threshold value is higher than said first channel threshold value.

3. The radio channel control method for use in a cellular system according to claim 1, wherein a channel having a high transmission rate is assigned to a mobile station using a channel having a low transmission rate if said load of the first cell is lower than said second channel threshold value or lower than another threshold value lower than said second channel threshold value.

4. The radio channel control method for use in a cellular system according to claim 1, wherein a common channel adapted to perform data transmission to said mobile stations is included as the channel having a low transmission rate.

5. The radio channel control method for use in a cellular system according to claim 1, wherein said first communication service is a circuit-switched communication service and said second communication service is a packet-switched communication service.

6. The radio channel control method for use in a cellular system according to claim 1, wherein said first communication service is a realtime communication service of a conversational or a streaming traffic class and said second communication service is a non-realtime communication service of an interactive or a background traffic class.

7. The radio channel control method in a cellular system according to claim 1 wherein said first communication service is a high-priority communication service and said second communication service is a low-priority communication service.

* * * * *